United States Patent

Bory et al.

Patent Number: 5,447,485
Date of Patent: Sep. 5, 1995

[54] METHOD AND APPARATUS FOR CLAMPING A TOOL IN A METAL CUTTING MACHINE

[75] Inventors: Michael Bory; Hans Bauer, both of Wattwil, Switzerland

[73] Assignee: Erosonic AG, Wattwil, Switzerland

[21] Appl. No.: 185,392

[22] Filed: Jan. 24, 1994

[30] Foreign Application Priority Data

Jan. 25, 1993 [CH] Switzerland .............. 204/93

[51] Int. Cl.6 .......................................... B23Q 3/155
[52] U.S. Cl. ........................................ 483/1; 409/233;
451/165; 451/910; 483/7; 483/31
[58] Field of Search ............... 483/1, 55, 56, 7, 31;
408/239 A, 240, DIG. 700; 409/232, 233, 234,
207; 51/59 SS, DIG. 11; 451/165, 910

[56] References Cited

U.S. PATENT DOCUMENTS

| | | | |
|---|---|---|---|
| 2,925,016 | 2/1960 | Walter et al. | 409/233 |
| 3,028,770 | 4/1962 | Pittwood | 409/207 X |
| 3,374,711 | 3/1968 | Saunders | 409/233 |
| 3,760,958 | 9/1973 | Lohneis | 483/902 |
| 4,751,916 | 6/1988 | Bory | 451/165 X |
| 4,934,103 | 6/1990 | Campergue et al. | 451/165 X |
| 5,140,773 | 8/1992 | Miwa et al. | 451/165 X |

*Primary Examiner*—Z. R. Bilinsky
*Attorney, Agent, or Firm*—Sughrue, Mion, Zinn, Macpeak and Seas

[57] ABSTRACT

An ultrasonic machining device 10 is attached to a movable carriage 3, and has a borehole 11 to whose free end a differential screw 14 is threaded. To clamp a tool 20, first the device is returned to a neutral position whereat a wrench 25, which is mounted stationarily in a frame 2, engages the differential screw which rests on a shoulder of the wrench with low prestress. The wrench is then rotated until the screw projects a specific amount beyond the end of the device. The tool is then threaded onto the screw until it abuts the device 10, and finally the screw is tightened by a pneumatic cylinder 32.

9 Claims, 1 Drawing Sheet

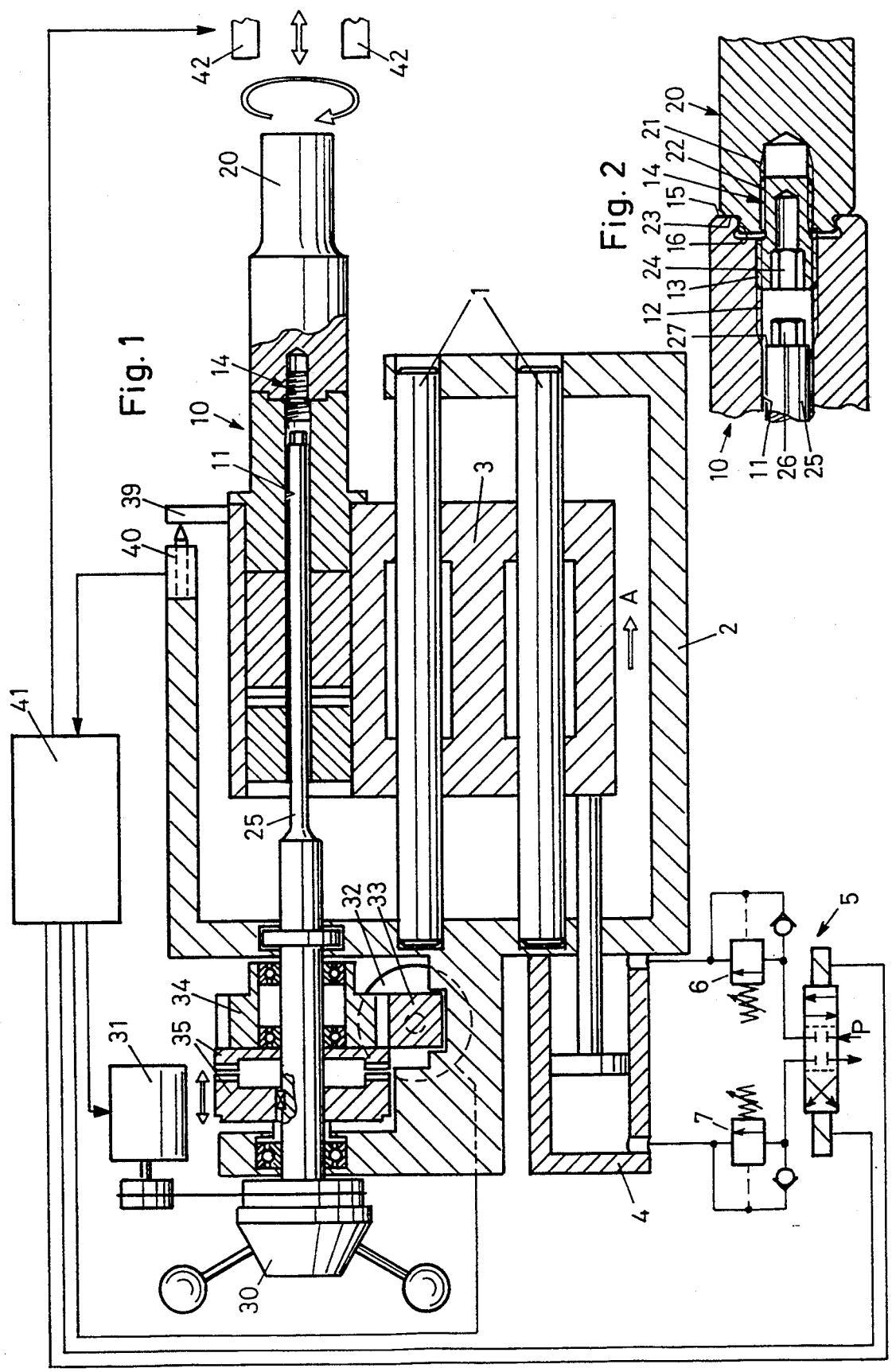

METHOD AND APPARATUS FOR CLAMPING A TOOL IN A METAL CUTTING MACHINE

BACKGROUND OF THE INVENTION

An ultrasonic machining tool is known from Swiss patent No. 665,784, where the tool or the sonotrode is attached by means of a differential screw. The device has an axial borehole, to which a wrench is permanently installed in order to tighten and loosen the differential screw. The wrench can be moved axially relative to the device and is prestressed by means of a spring into its retracted position, where it is disengaged with the differential screw. To rotate the screw, the wrench is engaged by a lifting magnet and subsequently rotated. This kind of manual connection gives satisfactory results for ultrasonic machining, but does not lend itself to automated control.

SUMMARY OF THE INVENTION

The present invention is based on the problem of providing a process and a metal cutting machine, with which the clamping of a tool can be automated.

BRIEF DESCRIPTION OF THE DRAWINGS

FIG. 1 is a diagrammatic longitudinal view of a metal cutting machine according to the invention; and FIG. 2 is an enlarged detail of a tool connection.

DETAILED DESCRIPTION OF THE PREFERRED EMBODIMENT

Referring to the drawings, a carriage 3 can be moved in a feed direction A on longitudinal guideways 1 of a machine frame 2 by a pneumatic cylinder 4. With an arrangement of valves 5 the force can be adjusted separately both in the direction of feed and in the return direction. To this end, there exist two separate pressure reducing valves 6, 7 for the two cylinder connections.

An ultrasonic machining device 10, whose axis extends parallel to the guideways 1, is mounted on the carriage 3. The device 10 has an axial borehole 11. On one end the borehole has an inner thread 12 (FIG. 2), into which a first thread 13 of a differential screw 14 is screwed. On its end the device 10 has a stop face 15 and a centering shoulder 16.

The tool 20 or the sonotrode is screwed with another inner thread 21 on the second thread 22 of the differential screw 14, with its end face 23 bearing on the stop face 15, and centered by the shoulder 16. The threads 21, 22 have a greater pitch than the threads 12, 13. Thus, the connection can be tightened by rotating the differential screw 14 without relative rotation between device 10 and tool 20. The screw 14 has a hexagonal recess 24.

A wrench 25, which is permanently installed in the borehole 11, serves to tighten and loosen the screw. The wrench has a hexagonal head 26 followed by a stop shoulder 27 for the screw 14 to abut. The wrench can be mounted freely rotatable but axially immovably in the frame 2. It can be rotated either manually by a rotary knob 30 or by a servomotor 31 to adjust the screw 14. To tighten the screw, there is another pneumatic cylinder 32, which rotates a gear wheel 34 coaxial to the wrench via a rack 33. The pressure of the cylinder 32, and attendantly the torque of the gear wheel 34, is adjustable. The gear wheel can be coupled to the wrench 25 by a pneumatically or electrically operated claw coupling 35.

Attached to the carriage is an arm 39, which actuates a sensing element 40 in the retracted or neutral position of the carriage 3, shown in FIG. 1. The sensing element 40 measures the carriage stroke and is connected to a control unit 41.

To clamp the tool 20 the carriage is first moved into its retracted neutral position, where-at the hexagonal head 26 engages the hexagonal recess 24 of the differential screw 14, and the end face of the screw rests on the shoulder 27. The carriage 3 is pulled against this stop with a low force, adjusted by means of the valve 6. At this stage the screw 14 is rotated by the handwheel 30, or automatically by the control unit 41 and the servomotor 31, until the sensing element 40 reports a position where-at the second thread 22 of the differential screw 14 projects beyond the stop face 15 by an exactly defined amount. At this stage the tool 20, which is controlled manually or also automatically by the control unit 41, is gripped and screwed onto the thread 22 by a tool changer 42, which is indicated schematically as chuck teeth in the drawing, until it friction-locks against the stop face 15. Finally, the coupling 35 is engaged and the cylinder 32 is loaded with an adjusted pressure, so that the screw 14 is tightened with a precisely defined torque.

During the ultrasonic machining the carriage is advanced in the feed direction A. The wrench 25 remains in its fixed axial position, so that when the carriage 3 returns, the wrench again engages the differential screw 14. To release the connection, the cylinder 32 is loaded in the opposite direction until it strikes its stop. The tool 20 is then unscrewed from the thread 22 manually or by the changer 42.

With the described connection, the differential screw is screwed both into the device 10 and into the tool 20 with an exactly defined number of threads. Thus, a highly reliable connection is achieved. The invention enables the tools to be changed automatically, a feature that was not possible to date for ultrasonic machining systems.

We claim:

1. A process for clamping a tool (20) in a cutting machine (10), in particular an ultrasonic cutting machine, wherein the clamped tool is connected by a differential screw (14) to a machining device (10) having an axial borehole (11), which is coaxial to the differential screw and in which a wrench (25) is disposed for rotating the differential screw, and wherein the wrench is rotatably mounted and axially immovable in a frame (2) of the machine; comprising the steps of:
   a) moving the machining device axially to a position where-at the wrench is operatively coupled to the screw with a front end face (27) of the wrench abutting a rear end of the differential screw;
   b) rotating the wrench such that the differential screw (14) projects beyond an end face (15) of the machining device (10) by a predetermined amount;
   c) threading the tool (20) onto an opposite, front end of the differential screw and into a friction-locking engagement with the machining device (10), and
   d) tightening the differential screw with an adjustable torque by means of the wrench.

2. A process as claimed in claim 1, further comprising determining the predetermined amount by which the differential screw projects by measuring an axial position of the machining device (10).

3. A process as claimed in claim 2, wherein said axial position is measured by a sensing element (40) whose output controls, via a control unit (41), a servomotor (31) in order to rotate the wrench (25).

4. A process as claimed in claim 1, wherein the tool (20) is screwed on the differential screw (14) by an automatic tool changer (42).

5. An ultrasonic cutting machine, comprising:
a) a carriage (3) movably mounted on guides (1) of a machine frame (2),
b) linear drive means (4) coupled to the carriage for the movement thereof in two opposite directions,
c) a machining device (10) mounted on the carriage and defining a continuous axial borehole (11),
d) a differential screw (14) having one end threaded into the borehole of the machining device with a first thread (13), and which defines a wrench engagement coupling (24),
e) a wrench (25) insertable into the borehole for engaging the coupling of the differential screw, and having a front end face (27) for abutment against the screw, wherein the wrench is mounted to the machine frame (2) in a rotatable but axially immovable manner,
f) rotary drive means (32–35) for rotating the wrench, and
g) measuring means (40) for measuring a stroke of the carriage adjacent a retracted neutral position thereof.

6. A machine as claimed in claim 5, further comprising means (42) for automatically mounting and screwing a tool (20) on an outwardly extending second thread (22) of the differential screw (14).

7. A machine as claimed in claim 6, wherein the rotary drive means comprises a selectively connectable drive for generating an adjustable torque.

8. A machine as claimed in claim 7, wherein the selectively connectable drive comprises a gear wheel (34) connectable to the wrench by a claw coupling (35), a rack (33) mating with the gear wheel, and a fluid cylinder unit (32) connected to the rack.

9. A machine as claimed in claim 6, wherein the wrench is rotatable by a servomotor (31) controlled by the measuring means (40) via a control unit (41).

* * * * *